(12) United States Patent
Wang et al.

(10) Patent No.: US 8,085,377 B2
(45) Date of Patent: Dec. 27, 2011

(54) LIQUID CRYSTAL DISPLAY PANEL AND LCD DEVICE USING THE SAME WITH PARTICULAR ALIGNING ELECTRODES

(75) Inventors: Wen-Chun Wang, Taichung (TW); Kuo-Chang Su, Tainan County (TW)

(73) Assignee: Wintek Corporation, Taichung (TW)

( * ) Notice: Subject to any disclaimer, the term of this patent is extended or adjusted under 35 U.S.C. 154(b) by 433 days.

(21) Appl. No.: 12/486,812

(22) Filed: Jun. 18, 2009

(65) Prior Publication Data
US 2009/0323002 A1   Dec. 31, 2009

(30) Foreign Application Priority Data
Jun. 27, 2008 (TW) .............................. 97124109 A

(51) Int. Cl.
*G02F 1/1343* (2006.01)
*G02F 1/1337* (2006.01)
(52) U.S. Cl. ......... 349/139; 349/129; 349/144; 349/146
(58) Field of Classification Search .................. 349/139, 349/129, 144, 146
See application file for complete search history.

(56) References Cited

U.S. PATENT DOCUMENTS
5,999,234 A * 12/1999 Budd et al. ...................... 349/38
7,800,139 B2 * 9/2010 Lee et al. ...................... 257/213
7,808,567 B2 * 10/2010 Lin et al. ...................... 349/42
2007/0103615 A1 5/2007 Cheng et al.

FOREIGN PATENT DOCUMENTS
CN   1963647   5/2007
CN   101109883   1/2008

OTHER PUBLICATIONS

English language translation of abstract of CN 1963647 (published May 16, 2007).
English language translation of abstract of CN 101109883 (published Jan. 23, 2008).

* cited by examiner

Primary Examiner — Mike Qi
(74) Attorney, Agent, or Firm — Thomas|Kayden

(57) ABSTRACT

A liquid crystal display (LCD) panel and an LCD device using the same are provided. The LCD panel includes a first and a second substrate, wherein a liquid crystal layer is sealed between the first and the second substrates. The first substrate has a plurality of pixel unit each including a data line, a scan line, a switch element, a first pixel electrode, a second pixel electrode, a first aligning electrode and a second aligning electrode. The scan line corresponds to a gap between the first pixel electrode and the second pixel electrode. The switch element has an input terminal, a control terminal, a first output terminal and a second output terminal. The first aligning electrode and the second aligning electrode correspond to the edges of the first pixel electrode and the second pixel electrode respectively, and receive a voltage of a common electrode.

18 Claims, 8 Drawing Sheets

LIQUID CRYSTAL DISPLAY PANEL AND LCD DEVICE USING THE SAME WITH PARTICULAR ALIGNING ELECTRODES

This application claims the benefit of Taiwan application Serial No. 97124109, filed Jun. 27, 2008, the subject matter of which is incorporated herein by reference.

BACKGROUND OF THE INVENTION

1. Field of the Invention

The invention relates in general to a liquid crystal display (LCD) panel and an LCD device using the same, and more particularly to an LCD panel having multi-domain effect and an LCD device using the same.

2. Description of the Related Art

At present, LCD device, which provides wide view-angle effect, mostly makes use of protrusions or slits formed between its top and bottom substrates for controlling the tilting direction of liquid crystal molecules. Normally, the protrusions are fabricated on an electrode; the slits are formed by patterning the electrode directly.

Although the protrusions help to achieve multi-domain effect, the bevel of the protrusions will generate boundary energy on liquid crystal molecules and make the liquid crystal molecules tilting and no more perpendicular to the substrate. Thus, when the driving voltage is zero, the alignment of liquid crystal molecules is not perpendicular, and there will be some light leakage under the front view angle due to the tilting of liquid crystal molecules.

As for how to achieve multi-domain effect by slits, the alignment precision between the top and the bottom substrates, the width of the slits and the interval between the slits must be taken into account, otherwise, the multi-domain effect will be very limited, and disclination will occur to liquid crystal molecules above the slits or between two slits, and the entire transparency will be deteriorated accordingly.

SUMMARY OF THE INVENTION

The invention is directed to a liquid crystal display (LCD) panel and an LCD device using the same. The aligning electrode, directly fabricated in the substrate, and the pixel electrode create a voltage difference, thereby generating more display domains.

According to a first aspect of the present invention, an LCD panel is provided. The LCD panel includes a first substrate and a second substrate parallel to the first substrate, wherein a liquid crystal layer is sealed between the first substrate and the second substrates. The first substrate has a plurality of pixel units. Each pixel unit includes a data line, a scan line, a switch element, a first pixel electrode, a second pixel electrode, a first aligning electrode and a second aligning electrode. The first pixel electrode and the second pixel electrode are adjacent to each other. The scan line corresponds to a gap between the first pixel electrode and the second pixel electrode. The switch element has an input terminal, a control terminal, a first output terminal and a second output terminal, wherein the input terminal is coupled to the data line, the control terminal is coupled to the scan line, the first output terminal is coupled to the first pixel electrode, and the second output terminal is coupled to the second pixel electrode. The first aligning electrode and the second aligning electrode correspond to the edges of the first pixel electrode and the second pixel electrode respectively, and receive a voltage of a common electrode.

According to a second aspect of the present invention, an LCD device is provided. The LCD device includes a data driver, a scan driver and an LCD panel. The LCD panel includes a first substrate and a second substrate parallel to the first substrate, wherein a liquid crystal layer is sealed between the first substrate and the second substrate. The first substrate has a plurality of pixel units. Each pixel unit includes a data line, a scan line, a switch element, a first pixel electrode, a second pixel electrode, a first aligning electrode and a second aligning electrode. The data line is coupled to the data driver, and the scan line is coupled to the scan driver. The first pixel electrode and the second pixel electrode are adjacent to each other. The scan line corresponds to a gap between the first pixel electrode and the second pixel electrode. The switch element has an input terminal, a control terminal, a first output terminal and a second output terminal, wherein the input terminal is coupled to the data line, the control terminal is coupled to the scan line, the first output terminal is coupled to the first pixel electrode, and the second output terminal is coupled to the second pixel electrode. The first aligning electrode and the second aligning electrode correspond to the edges of the first pixel electrode and the second pixel electrode respectively, and receive a voltage of a common electrode. Moreover, the first pixel electrode has a first display block and a first coupling block connected to each other, and the first coupling block is coupled to the first output terminal. The second pixel electrode has a second display block and a second coupling block connected to each other, and the second coupling block is coupled to the second output terminal.

The invention will become apparent from the following detailed description of the preferred but non-limiting embodiments. The following description is made with reference to the accompanying drawings.

DETAILED DESCRIPTION OF THE INVENTION

Figure 1:
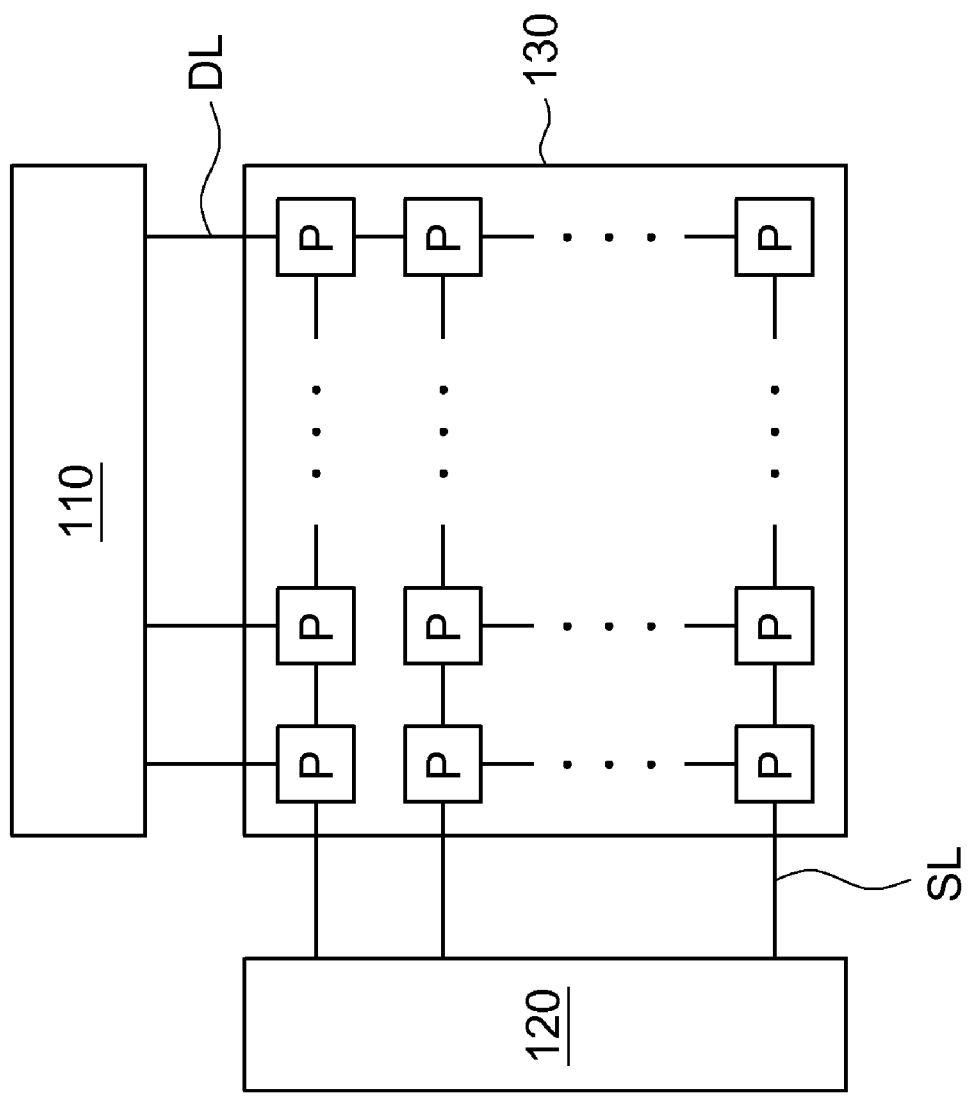
FIG. 1 shows an LCD device according to a preferred embodiment of the invention.

Referring to FIG. 1, an LCD device according to a preferred embodiment of the invention is shown. The LCD device 10 includes a data driver 110, a scan driver 120 and an LCD panel 130. The LCD panel 110 includes a plurality of pixel units P, a plurality of data lines DL, and a plurality of scan lines SL. The data driver 110 is coupled to the data lines DL and outputs corresponding data signals to the pixel units P via the data lines DL. The scan driver 120 is coupled to the scan lines SL and outputs scan signals via the scan lines SL to sequentially enable each row of pixel units.

In the LCD panel 130, each pixel unit P includes two pixel electrodes, a switch element and two aligning electrodes. In each pixel unit P, two output terminals of the switch are coupled to the two pixel electrodes, and one aligning electrode corresponds to the edges of one pixel electrode. Each aligning electrode receives a voltage of a common electrode, such that a voltage difference between the aligning electrode and the pixel electrode generates a fringe field effect for tilting the direction of the electrical field at the edges of the pixel electrode. As a result, liquid crystal molecules will tilt accordingly, and micro domains with different tilting directions are obtained.

The design of pixel structure of each pixel unit P in the LCD panel is disclosed below. In each pixel unit P, the switch element is exemplified by a thin film transistor (TFT), the input terminal of the switch element is exemplified by a source electrode, the control terminal of the switch element is exemplified by a gate electrode, and the two output terminals of the switch element are exemplified by two independent drain electrodes. The gate electrode of the switch element is coupled to the scan line SL, and the source electrode of the switch element is coupled to the data line DL.

First Embodiment

Figure 2A:
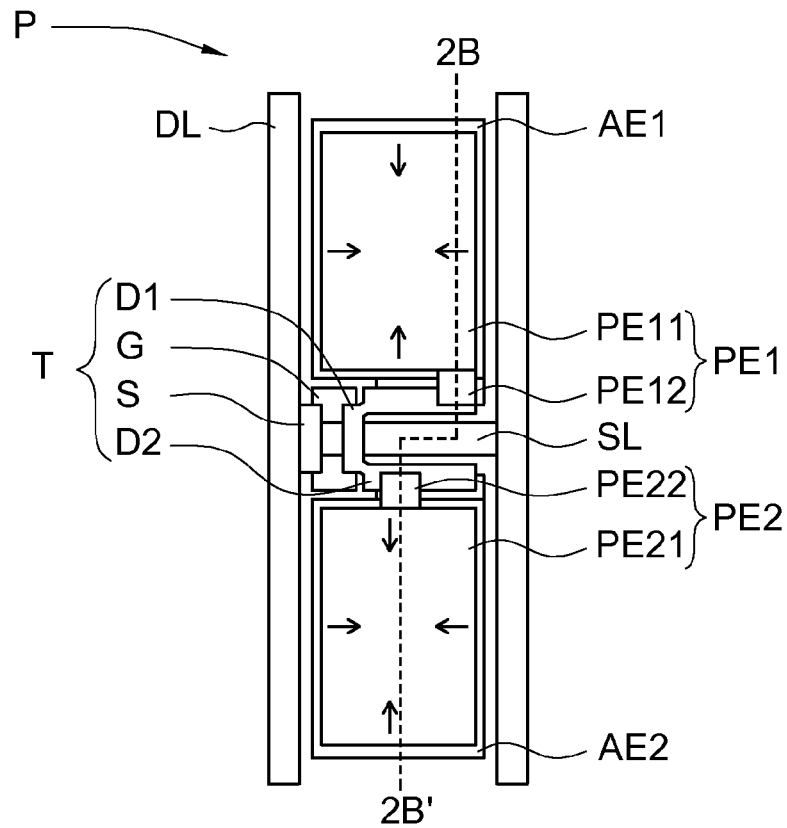
FIG. 2A shows the structure of a pixel unit of the LCD of a first embodiment.
Figure 2B:
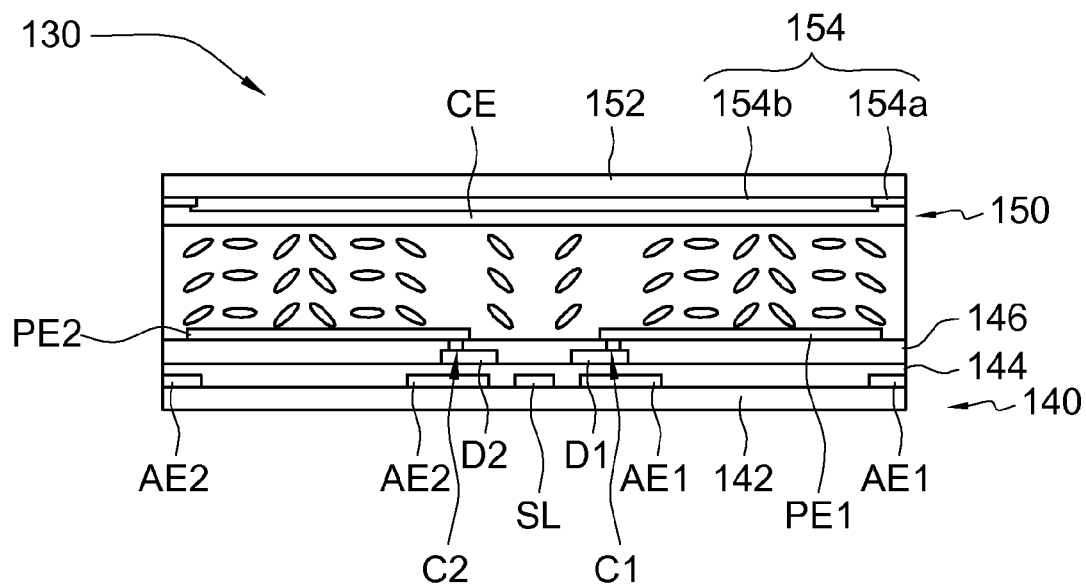
FIG. 2B shows a cross-sectional view of the LCD panel of FIG. 2A along a tangent line 2B-2B'.

FIG. 2A shows the structure of a pixel unit of the LCD of a first embodiment. FIG. 2B shows a cross-sectional view of the LCD panel of FIG. 2A along a tangent line 2B-2B'. As shown in FIG. 2A, the pixel unit P includes a first pixel electrode PE1, a second pixel electrode PE2, and a switch element T. The first pixel electrode PE1 and the second pixel electrode PE2 are adjacent to each other, and the scan line SL corresponds to a gap between the first pixel electrode PE1 and the second pixel electrode PE2. The switch element T has an input terminal S (the source electrode), a control terminal G (the gate electrode) and two output terminal D1 and D2 (the drain electrodes), wherein the input terminal S is coupled to the data line DL, the control terminal G is coupled to the scan line SL, the output terminal D1 is coupled to the first pixel electrode PE1, and the output terminal D2 is coupled to the second pixel electrode PE2. The first aligning electrode AE1 and the second aligning electrode AE2 correspond to the edges of the first pixel electrode PE1 and the second pixel electrode PE2 respectively, and receive a voltage of a common electrode CE (shown in FIG. 2B).

As the scan line SL crosses the center of the pixel unit P, the pixel unit P is divided into two sub-display areas. The first pixel electrode PE1 and the second pixel electrode PE2 each corresponding to one sub-display area are controlled by the output terminals D1 and D2 of the switch element T respectively for increasing the response rate of the liquid crystal molecules inside the sub-display areas.

The first pixel electrode PE1 and the second pixel electrode PE2 are disposed at two opposite sides of the scan line SL respectively. The first pixel electrode PE1 has a first display block PE11 and a first coupling block PE12 connected to each other, wherein the first coupling block PE12 is coupled to the output terminal D1 of the switch element T. The second pixel electrode PE2 has a second display block PE21 and a second coupling block PE22 connected to each other, wherein the second coupling block PE22 is coupled to the output terminal D2 of the switch element T.

In FIG. 2A, preferably, the first coupling block PE12 is disposed at a corner of the first display block PE11, and the second coupling block PE22 is connected to the center of an edge of the second display block PE21, but the invention is not limited thereto. As the aligning electrode of the pixel unit P corresponds to the edges of pixel electrode, not limited to the pattern of the first aligning electrode AE1 and the second aligning electrode AE2 shown in FIG. 2A that correspond to the edges of the first pixel electrode PE1 and the second pixel electrode PE2 respectively, the liquid crystal molecules can always tile to desired direction no matter the pattern of the pixel electrodes is symmetric or not.

Figure 2C:
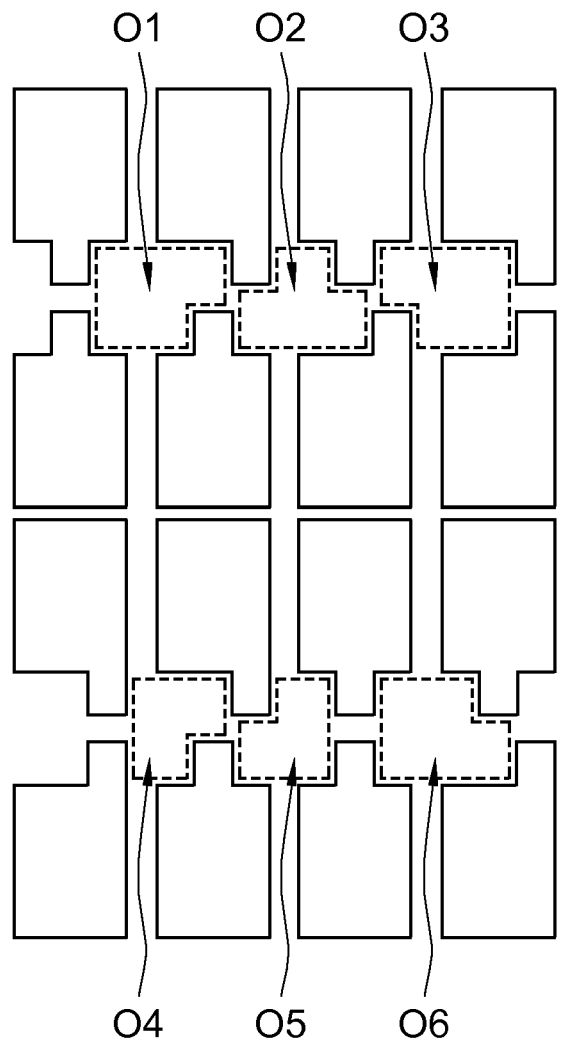
FIG. 2C shows an entire pixel electrode having symmetric and non-symmetric coupling blocks.

Referring to FIG. 2C, an entire pixel electrode having symmetric and non-symmetric coupling blocks is shown. As shown in FIG. 2C, the coupling blocks of two vertically adjacent pixel units can be either symmetric or non-symmetric. The non-symmetric coupling blocks enable the pixel electrode to form irregular openings such as the openings O1~O6. Thus, there is a high degree of freedom regarding the design of the connection between the pixel electrode and the output terminal, that is, the positions of the coupling blocks.

As shown in FIG. 2A, the first aligning electrode AE1 corresponds to four edges of the first pixel electrode PE1, and the second aligning electrode AE2 corresponds to four edges of the second pixel electrode PE2. As there is a voltage difference between the aligning electrode and the pixel electrode, four different tilting directions of electrical field are generated at the edges of the pixel electrode for tilting liquid crystal molecules to four different directions. Thus, the liquid crystal molecules inside the two sub-display areas of the pixel unit P are both affected by the electrical field and tilt towards the directions indicated by the arrows. Consequently, the effect of four display domains is generated.

In other embodiments, there is no need for one aligning electrode to correspond to all edges of one pixel electrode as shown in FIG. 2A. The multi-domain effect can still be generated as the first aligning electrode AE1 only corresponds to three edges of the first pixel electrode PE1 (such as the right edge, the left edge and the top edge) and the second aligning electrode AE2 only corresponds to three edges of the second pixel electrode PE2 (such as the right edge, the left edge and the bottom edge).

As shown in FIG. 2B, the first substrate 140 of the LCD panel 130 is, for example, an array substrate, and elements such as signal lines, switch elements and electrodes are disposed in the first substrate 140. The LCD substrate 130 further includes a second substrate 150 parallel to the first substrate 140, wherein a liquid crystal layer is sealed between the first substrate 140 and the second substrate 150. In the present embodiment of the invention, the second substrate 150 is, for example, a color filter substrate. The second substrate 150 has a base plate 152, a color filter 154 and a common electrode CE, wherein the color filter 154 is located between the base plate 152 and the common electrode CE and has a black matrix 154a and a filter layer 154b.

In FIG. 2B, the first substrate 140 has a base plate 142 and two insulation layers 144 and 146. The first aligning electrode AE1 and the second aligning electrode AE2 together with the scan line SL and the control terminal G (shown in FIG. 2A) are disposed between the base plate 142 and the insulation layer 144. That is, the first aligning electrode AE1, the second aligning electrode AE2, the scan line SL, and the control terminal G are fabricated at the some time by one signal manufacturing process. The data line DL (shown in FIG. 2A), the input terminal S (shown in FIG. 2A), and the output terminals D1 and D2 are disposed between the insulation layer 144 and the insulation layer 146. The output terminals D1 and D2 are coupled to the first pixel electrode PE1 and the second pixel electrode PE2 respectively via contact holes C1 and C2.

There are overlapping portions between the first aligning electrode AE1 and the first pixel electrode PE1, between the second aligning electrode AE2 and the second pixel electrode PE2, between the first aligning electrode AE1 and the output terminal D1, and between the second aligning electrode AE2 and the output terminal D2. However, the invention is not limited thereto, and the above elements can be disposed without any overlaps. The overlapped portion between the first aligning electrode AE1 and the first pixel electrode PE1 as well as the overlapped portion between the second aligning electrode AE2 and the second pixel electrode PE2 can both be used as storage capacitors. Besides, the overlapped portion between the first aligning electrode AE1 and the output terminal D1 as well as the overlapped portion between the second aligning electrode AE2 and the output terminal D2 can also be used as storage capacitors.

Figure 3:
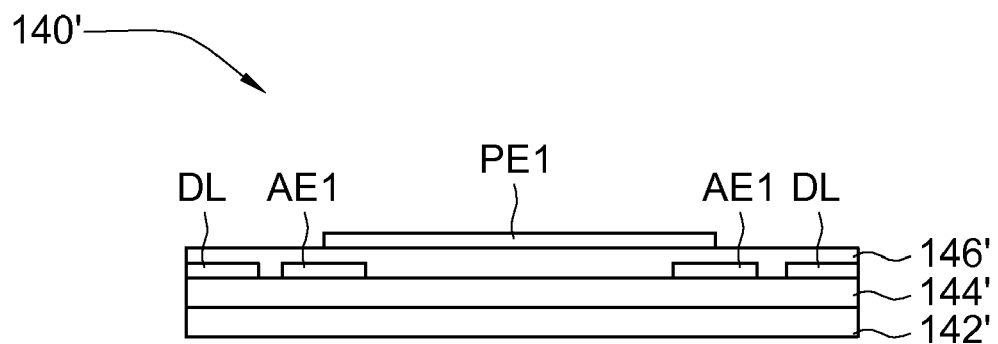
FIG. 3 shows an aligning electrode and data lines disposed on the same layer of the substrate.

The first aligning electrode AE1 and the second aligning electrode AE2 can also be disposed at other positions of the first substrate 140. Referring to FIG. 3, an aligning electrode and data lines disposed on the same layer of the substrate is shown. Let FIG. 2A where a tangent line parallel to the scan line SL crosses the sub-display area at the upper part of the pixel unit P be taken for example. The first aligning electrode AE1 and the data lines DL are disposed on the same layer of the first substrate 140'. For example, the first aligning electrode AE1 and the data lines DL are disposed between the insulation layers 144' and 146', and the scan line SL (shown in FIG. 2A) and the control terminal G (shown in FIG. 2A) are disposed between the base plate 142' and the insulation layer 144'. Thus, in FIG. 2A, the first aligning electrode AE1, the second aligning electrode AE2 together with the data lines DL, the input terminal S, and the output terminals D1 and D2 are fabricated at the same time by one single manufacturing process. Thus, no additional manufacturing process is needed, and the distance between the pixel electrode and the aligning electrode is reduced, such that the strength of the fringe field is increased for enhancing the control over the tilting of the liquid crystal molecules. Besides, the overlapped portion between the aligning electrode and the pixel electrode can be used as a storage capacitor.

Figure 4:
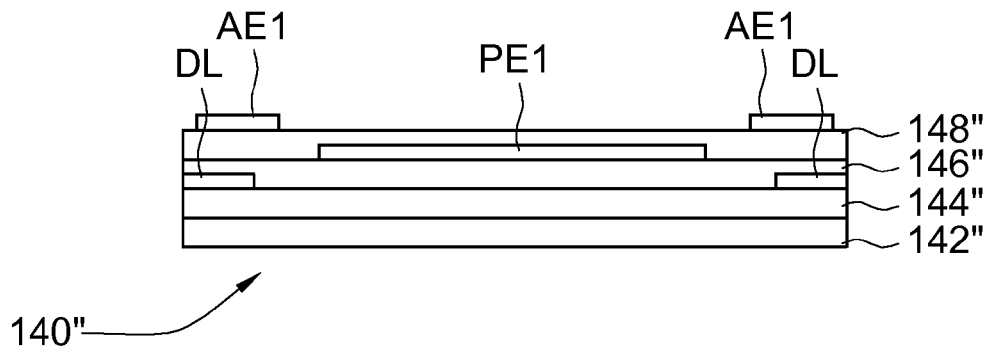
FIG. 4 shows an aligning electrode disposed on the topmost position of a substrate.

Referring to FIG. 4, an aligning electrode disposed on the topmost position of a substrate is shown. Likewise, FIG. 2A where a tangent line parallel to the scan line SL crosses the sub-display area at the upper part of the pixel unit P is taken for example. In the first substrate 140" of FIG. 4, another insulation layer 148" is directly formed on the first pixel electrode PE1 (other elements are disposed among the base plate 142", and the insulation layers 144" and 146"), and then the first aligning electrode AE1 surrounding the first pixel electrode PE1 is fabricated on the insulation layer 148". According to such method, the first aligning electrode AE1 is overlapped over the data line DL, and the aperture rate of the pixel unit is increased. The first aligning electrode AE1 can be connected to the common electrode CE by wiring.

Second Embodiment

Figure 5:
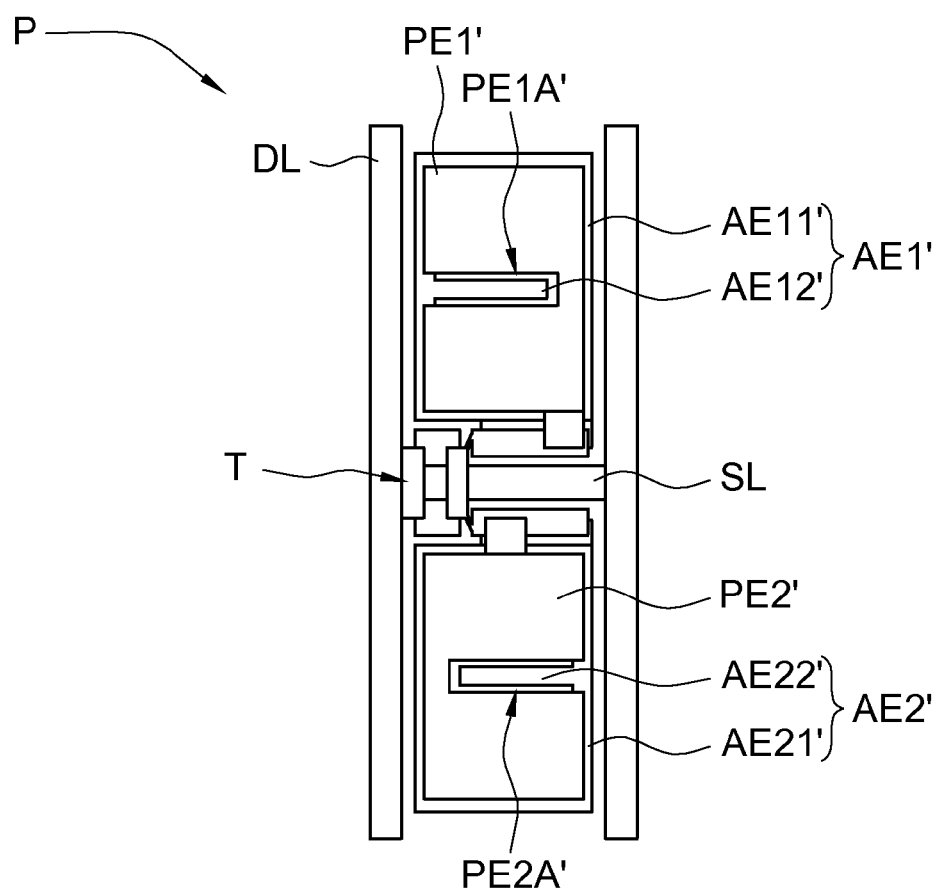
FIG. 5 shows the structure of a pixel unit of the LCD of a second embodiment.

The second embodiment differs from the first embodiment in the structure of the aligning electrode. As for the same elements, the same designations are used and are not repeated here. Referring to FIG. 5, the structure of a pixel unit of the LCD of a second embodiment is shown. In the pixel unit P, the first aligning electrode AE1' has a trunk electrode AE11' and a branch electrode AE12' connected to each other, and the second aligning electrode AE2' has a trunk electrode AE21' and a branch electrode AE22' connected to each other. The trunk electrode AE11' and AE21' correspond to the edges of the first pixel electrode PE1' and the second pixel electrode PE2' respectively. The first pixel electrode PE1' and the second pixel electrode PE2' have a long opening PE1A' and a long opening PE2A' respectively, wherein the branch electrodes AE12' and AE22' correspond to the long openings PE1A' and PE2A' respectively. Preferably, an extending direction of the long opening is substantially parallel to the scan line SL or parallel to the data line DL. In the present embodiment of the invention, the extending direction of the long openings PE1A' and PE2A' is parallel to the scan line SL.

The first aligning electrode AE1' and the second aligning electrode AE2' extend to the pixel electrode by the branch electrodes AE12' and AE22', for dividing the pixel unit P into more sub-display areas, such that the fringe field effect which controls the tilting of liquid crystal molecules is increased, and the liquid crystal molecules are more uniformly controlled.

Although the present embodiment of the invention is exemplified by the case that the trunk electrodes AE11' and AE21' correspond to all edges of the first pixel electrode PE1' and the second pixel electrode PE2', the invention is not limited thereto. In other embodiments, multi-domain effect can also be achieved when the trunk electrodes AE11' and AE21' only correspond to three edges of the pixel electrode, and the branch electrodes AE12' and AE22' are connected to the trunk electrode AE11' and AE21'. Besides, the aligning electrodes each can also have a plurality of branch electrodes, and the pixel electrodes each have a plurality of openings in response, thereby dividing the pixel electrodes into more sub-display areas.

Third Embodiment

Figure 6A:
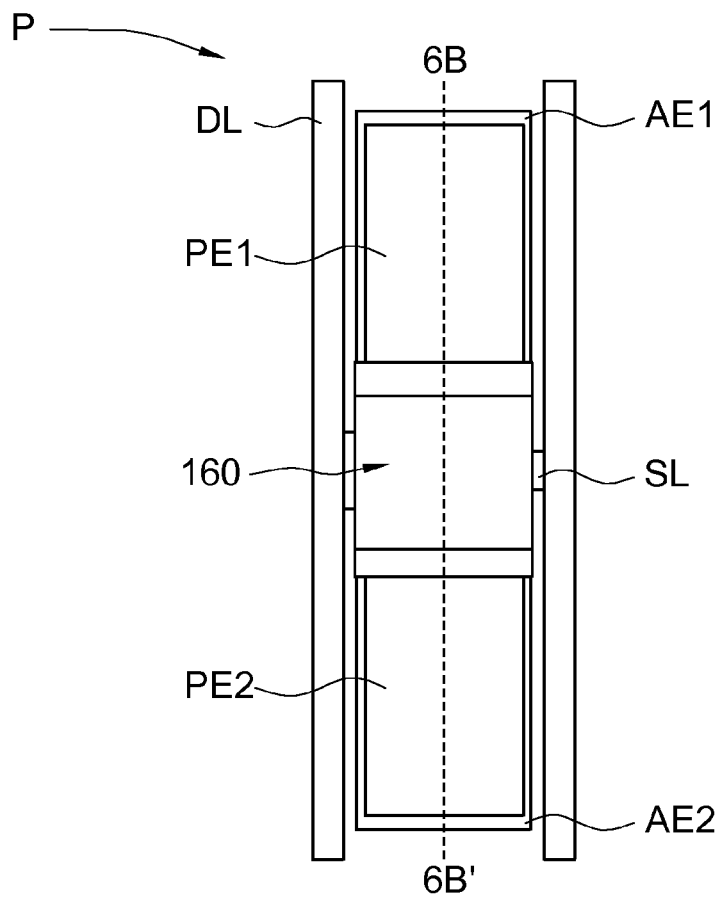
FIG. 6A shows the structure of a pixel unit of the LCD of a third embodiment having a reflection portion.
Figure 6B:
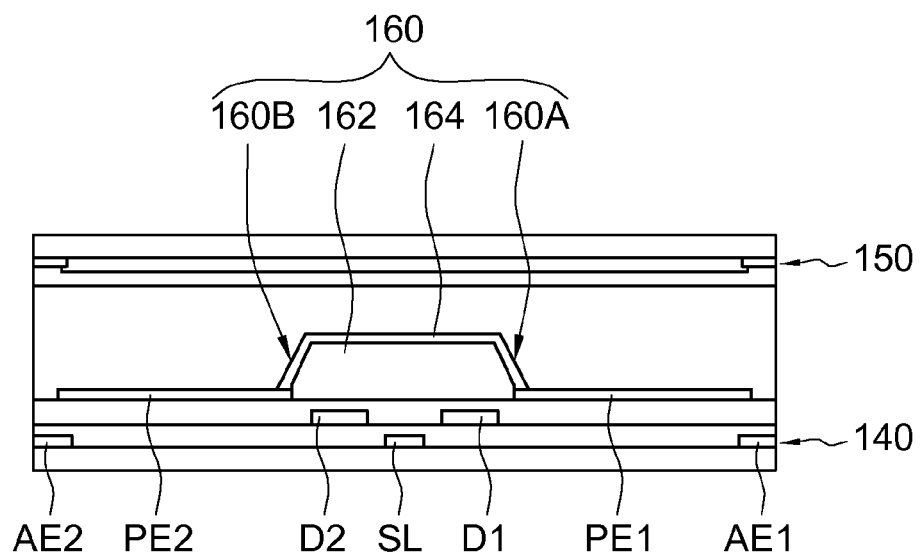
FIG. 6B shows a cross-sectional view of the LCD panel of FIG. 6A along a tangent line 6B-6B'.

The third embodiment differs from the first embodiment in the structure of the first substrate. As for the same elements, the same designations are used and are not repeated here. FIG. 6A shows the structure of a pixel unit of the LCD of a third embodiment having a reflection portion. FIG. 6B shows a cross-sectional view of the LCD panel of FIG. 6A along a tangent line 6B-6B'. As shown in FIGS. 6A, 6B, the pixel unit P further includes a reflection portion 160 corresponding to a gap between the first pixel electrode PE1 and the second pixel electrode PE2. The reflection portion 160 reflects the surrounding light for display purpose. Thus, the pixel unit P has the property of transflectivity. Preferably, the reflection portion 160 is a trapezoid structure having a bedding layer 162 and a reflection layer 164 for example. The reflection layer 164 entirely covers the bedding layer 162, and is directly connected to the first pixel electrode PE1 and the second pixel electrode PE2, such that the electrical potential of the reflection layer 164 is the same as that of the two pixel electrodes PE1 and PE2. The thickness of the bedding layer 162 is not restricted, and can be adjusted according to actual needs.

Preferably, the reflection portion 160 has at least one aligning bevel tilting to the first pixel electrode PE1 or the second pixel electrode PE2. In the present embodiment of the invention, the reflection portion 160 has two aligning bevels 160A and 160B tilting to the first pixel electrode PE1 and the second pixel electrode PE2 respectively. There is no restriction regarding the contained angle between the two aligning bevels 160A and 160B and the first substrate 140.

As shown in FIG. 6B, the first aligning electrode AE1 and the second aligning electrode AE2 and the scan line SL (the control terminal, that is, the gate electrode) are fabricated at the same time by one signal manufacturing process. However, the aligning electrode of the present embodiment of the invention can also be fabricated according to other manufacturing processes as shown in FIGS. 3 and 4.

Let the sub-display area in the upper part of the pixel unit P be taken for example. The fringe field effect caused by the voltage difference between the first aligning electrode AE1 and the first pixel electrode PE1 generates three different tilting directions of electrical filed at the edges. In addition to the above three different tilting directions of electrical filed at the edges, the aligning bevel 160A of the reflection portion 160 provides a pre-tilting angle of liquid crystal molecules. Therefore, four different tilting directions of liquid crystal molecules are generated, and the liquid crystal micro-domains with four different tilting directions, that is, four display domains, are generated.

Figure 7A:
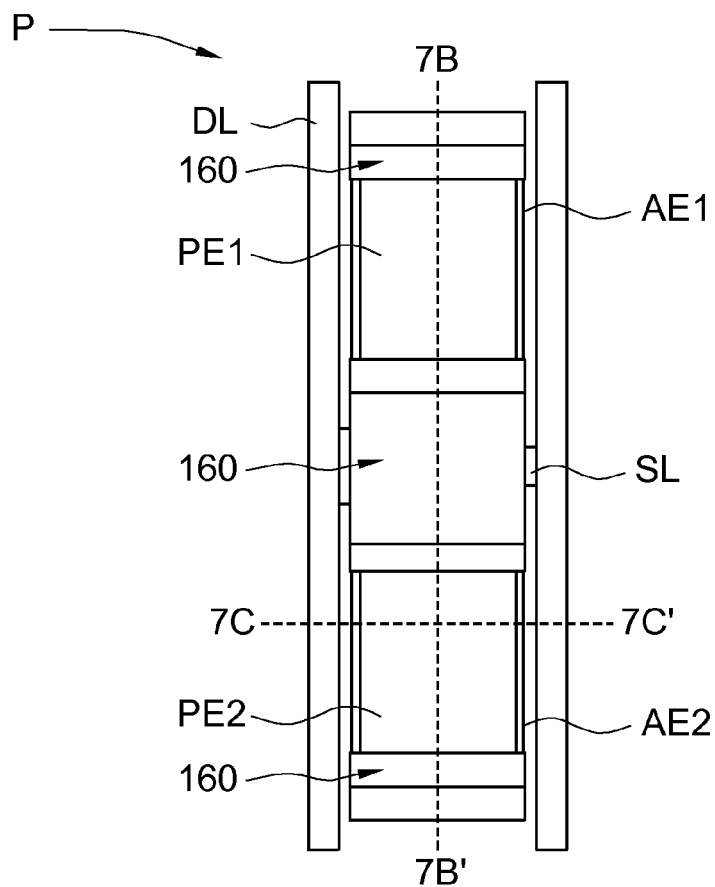
FIG. 7A shows the structure of a pixel unit having a plurality of reflection portions.
Figure 7B:
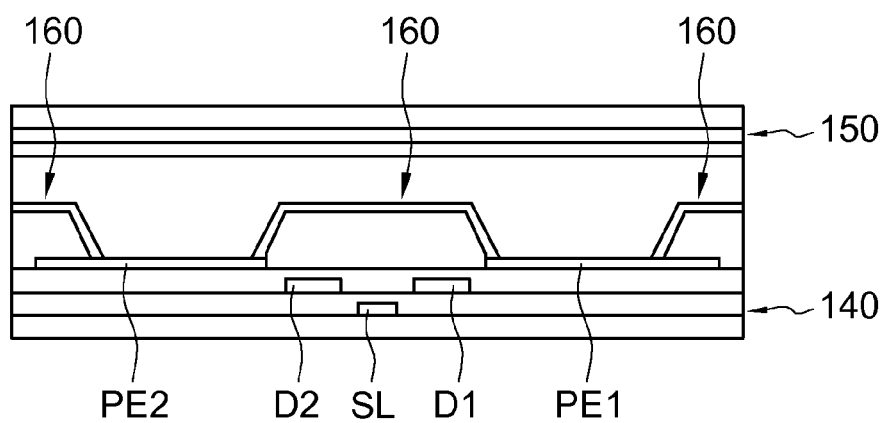
FIG. 7B shows a cross-sectional view of the LCD panel of FIG. 7A along a tangent line 7B-7B'.
Figure 7C:
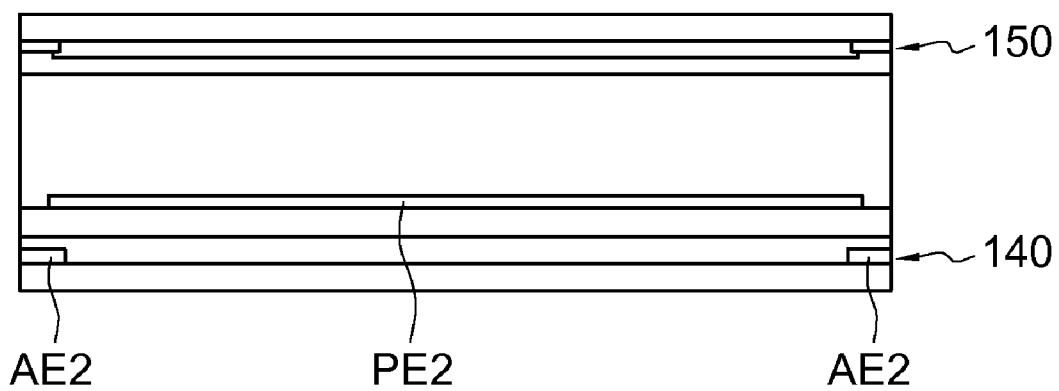
FIG. 7C shows a cross-sectional view of the LCD panel of FIG. 7A along a tangent line 7C-7C'.

FIG. 7A shows the structure of a pixel unit having a plurality of reflection portions. FIG. 7B shows a cross-sectional view of the LCD panel of FIG. 7A along a tangent line 7B-7B'. FIG. 7C shows a cross-sectional view of the LCD panel of FIG. 7A along a tangent line 7C-7C'. The pixel unit P has a plurality of reflection portions 160 respectively located at the top edge of the upper sub-display area, the bottom edge of the lower sub-display area and the gap between two pixel electrodes PE1 and PE2. The three reflection portions 160 are all connected to the pixel electrodes PE1 and PE2 to generate the same electrical potential. As shown in FIGS. 7A to 7C, although the first aligning electrode AE1 and the second aligning electrode AE2 correspond to only two edges of the pixel electrodes PE1 and PE2, the effect of four display domains still can be achieved as long as the aligning bevels of three reflection portions 160 are used.

Fourth Embodiment

Figure 8A:
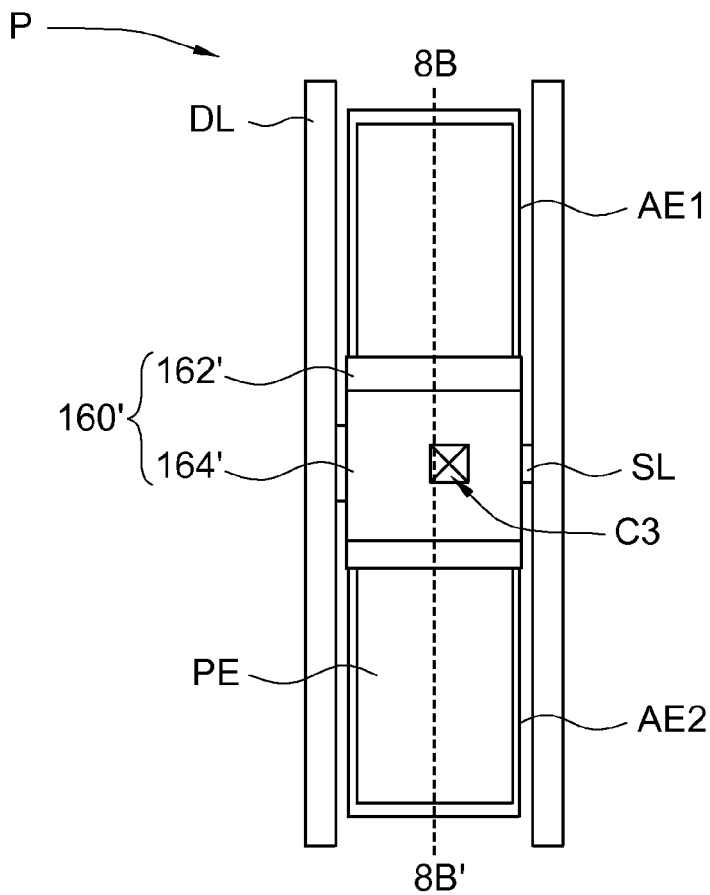
FIG. 8A shows the structure of a pixel unit of the LCD of a fourth embodiment having a reflection portion.
Figure 8B:
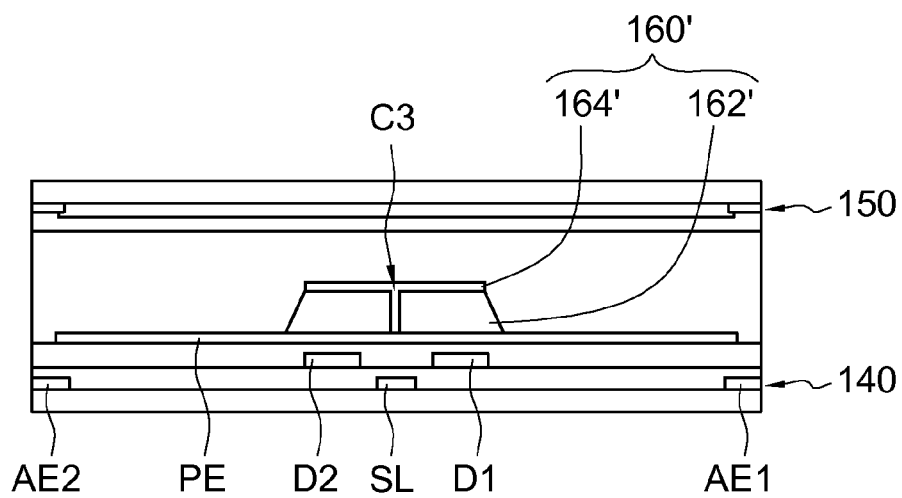
FIG. 8B shows a cross-sectional view of the LCD panel of FIG. 8A 的 along a tangent line 8B-8B'.

The fourth embodiment differs from the third embodiment in the coupling between the reflection layer and the pixel electrode. As for the same elements, the same designations are used and are not repeated here. FIG. 8A shows the structure of a pixel unit of the LCD of a fourth embodiment having a reflection portion. FIG. 8B shows a cross-sectional view of the LCD panel of FIG. 8A along a tangent line 8B-8B'. As shown in FIGS. 8A and 8B, the reflection layer 164' of the reflection portion 160' only covers the top surface of the bedding layer 162' to reflect the surrounding light. To make the reflection layer 164' have the same electrical potential as the pixel electrode PE, the reflection layer 164' is coupled to the pixel electrode PE by the contact hole C3 of the bedding layer 162'.

In the present embodiment of the invention, the aligning bevels (not marked) of the reflection portion 160' used for providing a pre-tilting angle to liquid crystal molecules and the two aligning electrodes are used to achieve multi-domain effect. The present embodiment of the invention can make use of more reflection portions 160' that are coupled to the pixel electrodes by contact holes in the pixel unit P to achieve multi-domain effect.

In each of the above embodiments, chiral dopant can be added to the liquid crystal layer of the LCD panel to help the rotation of liquid crystal molecules, and circular polarizer system can be further incorporated to reduce the disclination of liquid crystal molecules.

According to the LCD panel and the LCD device using the same disclosed in the above embodiments of the invention, a scan line divides a pixel unit into two sub-display areas, and two output terminals (the drain electrodes) are respectively extended from the scan line to control the pixel electrodes inside the two sub-display area for increasing the response rate of liquid crystal molecules. Each sub-display area has an aligning electrode corresponding to the edges of the pixel electrode. When the aligning electrode receives a voltage of a common electrode, there is a voltage difference occurring between the aligning electrode and the pixel electrode for generating fringe field. Thus, liquid crystal micro-domains with many different tilting directions can be produced in each sub-display area. The process of manufacturing these aligning electrodes is directly integrated into the original manufacturing process of the substrate. For example, the pattern for manufacturing process is changed such that the aligning electrodes can be fabricated at the same time by one signal process. Therefore, there is no need to change the original process or add any extra process, and the manufacturing process does not incur additional cost. Compared with the conventional LCD panel which generates multi-domain effect by protrusions or slits, the LCD panel of each embodiment of the invention avoids the aligning error which occurs in the assembly of two substrates, and further simplifies the manufacturing process as well as the assembly process.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
    a first substrate and a second substrate parallel to the first substrate;
    a liquid crystal layer disposed between the first substrate and the second substrate; and
    a plurality of pixel units formed on the first substrate, wherein each pixel unit comprises:
        a data line;
        a scan line;
        a first pixel electrode and a second pixel electrode adjacent to each other, wherein the scan line corresponds to a gap between the first pixel electrode and the second pixel electrode;
        a switch element having an input terminal, a control terminal, a first output terminal and a second output terminal, wherein the input terminal is coupled to the data line, the control terminal is coupled to the scan line, the first output terminal is coupled to the first pixel electrode, and the second output terminal is coupled to the second pixel electrode; and
        a first aligning electrode and a second aligning electrode disposed corresponding to the edges of the first pixel electrode and the second pixel electrode respectively, wherein the first aligning electrode and the second aligning electrode receive a voltage of a common electrode.

2. The LCD panel according to claim 1, wherein the first aligning electrode and the second aligning electrode each have at least three trunk electrodes and at least one branch electrode, the trunk electrodes respectively correspond to the edges of the first pixel electrode and the second pixel electrode, the branch electrode connects the trunk electrode, and the first pixel electrode and the second pixel electrode each have at least one long opening to which the branch electrode corresponds.

3. The LCD panel according to claim 2, wherein an extending direction of the long opening is substantially parallel to the scan line or parallel to the data line.

4. The LCD panel according to claim 1, wherein the first substrate further comprises a base plate on which an insulation layer is disposed, and the scan line, the control terminal, the first aligning electrode and the second aligning electrode are disposed between the base plate and the insulation layer.

5. The LCD panel according to claim 4, wherein the data line, the input terminal, the first output terminal and the second output terminal are disposed on the insulation layer;
wherein the first aligning electrode is overlapped with the first output terminal, and the second aligning electrode is overlapped with the second output terminal.

6. The LCD panel according to claim 1, wherein the first substrate further comprises a base plate on which a first insulation layer and a second insulation layer are disposed, and the first insulation layer is disposed between the base plate and the second insulation layer;
wherein the scan line and the control terminal are disposed between the base plate and the first insulation layer;
wherein the data line, the input terminal, the first output terminal, the second output terminal, the first aligning electrode and the second aligning electrode are disposed between the first insulation layer and the second insulation layer.

7. The LCD panel according to claim 6, wherein the first pixel electrode and the second pixel electrode are disposed on the second insulation layer, the first aligning electrode is partially overlapped with the first pixel electrode, and the second aligning electrode is partially overlapped with the second pixel electrode.

8. The LCD panel according to claim 1, wherein the first substrate further comprises a base plate on which an insulation layer is disposed, the pixel units are disposed between the base plate and the insulation layer, and the first aligning electrode and the second aligning electrode are disposed on the insulation layer.

9. The LCD panel according to claim 1, wherein the first pixel electrode has a first display block and a first coupling block connected to each other, the first coupling block is coupled to the first output terminal, the second pixel electrode has a second display block and a second coupling block connected to each other, and the second coupling block is coupled to the second output terminal.

10. The LCD panel according to claim 9, wherein the first display block and the first coupling block constitute a first opening, and the second display block and the second coupling block constitute a second opening symmetric to the first opening.

11. The LCD panel according to claim 9, wherein the first display block and the first coupling block constitute a first opening, and the second display block and the second coupling block constitute a second opening not symmetric to the first opening.

12. The LCD panel according to claim 1, wherein each pixel unit further comprises a reflection portion corresponding to the gap between the first pixel electrode and the second pixel electrode, and the reflection portion has at least one aligning bevel tilting to the first pixel electrode or the second pixel electrode.

13. The LCD panel according to claim 12, wherein the reflection portion is coupled to at least one of the first pixel electrode and the second pixel electrode.

14. The LCD panel according to claim 13, wherein the reflection portion has a bedding layer and a reflection layer disposed on the bedding layer and coupled to at least one of the first pixel electrode and the second pixel electrode.

15. The LCD panel according to claim 12, wherein the reflection portion is a trapezoid structure.

16. An LCD device, comprising:
a data driver;
a scan driver; and
a LCD panel, comprising:
a first substrate and a second substrate parallel to the first substrate;
a liquid crystal layer disposed between the first substrate and the second substrate; and
a plurality of pixel units formed on the first substrate, wherein each pixel unit comprises:
a data line coupled to the data driver;
a scan line coupled to the scan driver;
a first pixel electrode and a second pixel electrode adjacent to each other, wherein the scan line corresponds to a gap between the first pixel electrode and the second pixel electrode;
a switch element having an input terminal, a control terminal, a first output terminal and a second output terminal, wherein the input terminal is coupled to the data line, the control terminal is coupled to the scan line, the first output terminal is coupled to the first pixel electrode, and the second output terminal is coupled to the second pixel electrode; and
a first aligning electrode and a second aligning electrode corresponding to the edges of the first pixel electrode and the second pixel electrode respectively, wherein the first aligning electrode and the second aligning electrode receive a voltage of a common electrode;
wherein the first pixel electrode has a first display block and a first coupling block connected to each other, the first coupling block is coupled to the first output terminal, the second pixel electrode has a second display block and a second coupling block connected to each other, and the second coupling block is coupled to the second output terminal.

17. The LCD device according to claim 16, wherein the first display block and the first coupling block constitute a first opening, and the second display block and the second coupling block constitute a second opening symmetric to the first opening.

18. The LCD device according to claim 16, wherein the first display block and the first coupling block constitute a first opening, and the second display block and the second coupling block constitute a second opening not symmetric to the first opening.

* * * * *